US012771491B2

(12) United States Patent

Yan et al.

(10) Patent No.: US 12,771,491 B2
(45) Date of Patent: Oct. 20, 2026

(54) MESSAGE RETRANSMISSION METHOD AND RELATED APPARATUS

(71) Applicant: HUAWEI TECHNOLOGIES CO., LTD., Shenzhen (CN)

(72) Inventors: Mao Yan, Chengdu (CN); Huang Huang, Shenzhen (CN); Kuandong Gao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 607 days.

(21) Appl. No.: 17/899,681

(22) Filed: Aug. 31, 2022

(65) Prior Publication Data

US 2022/0416958 A1 Dec. 29, 2022

Related U.S. Application Data

(63) Continuation of application No. PCT/CN2020/077498, filed on Mar. 2, 2020.

(51) Int. Cl.

*H04L 1/1867* (2023.01)
*H04W 72/21* (2023.01)
*H04W 74/0833* (2024.01)

(52) U.S. Cl.

CPC .......... *H04L 1/1887* (2013.01); *H04W 72/21* (2023.01); *H04W 74/0833* (2013.01)

(58) Field of Classification Search

CPC ............................ H04L 1/1887; H04W 72/21
See application file for complete search history.

(56) References Cited

U.S. PATENT DOCUMENTS

| | | | | |
|---|---|---|---|---|
| 9,445,378 | B2 * | 9/2016 | Yi | H04J 11/0069 |
| 11,368,915 | B2 * | 6/2022 | Muruganathan | H04W 52/245 |
| 11,973,559 | B2 * | 4/2024 | Priyanto | H04W 52/42 |
| 2011/0105059 | A1 * | 5/2011 | Gaal | H04W 52/42 455/127.1 |
| 2018/0331728 | A1 * | 11/2018 | Tsai | H04B 7/0408 |
| 2019/0045457 | A1 * | 2/2019 | Islam | H04W 52/146 |
| 2019/0261195 | A1 * | 8/2019 | Cheng | H04W 76/27 |

(Continued)

FOREIGN PATENT DOCUMENTS

| | | | |
|---|---|---|---|
| CN | 110392442 | A | 10/2019 |
| CN | 110583092 | A | 12/2019 |

(Continued)

OTHER PUBLICATIONS

Huawei, HiSilicon, General discussion of UL power control for NR. 3GPP TSG RAN WG1 NR Ad Hoc Meeting, Spokane, USA, Jan. 16-20, 2017, R1-1700063, 4 pages.

(Continued)

*Primary Examiner* — Jasper Kwoh

(57) ABSTRACT

A message retransmission method includes: User equipment sends a message to a network device at a first power using a first spatial filter; and the user equipment retransmits the message to the network device using N second spatial filters, where a second power ramping counter corresponding to a transmit power of each of P second spatial filters is greater than a first power ramping counter corresponding to the first power, and the N second spatial filters include at least one spatial filter different from the first spatial filter. Both N and P are positive integers, and P is less than or equal to N.

15 Claims, 7 Drawing Sheets

(56) References Cited

U.S. PATENT DOCUMENTS

| | | | | |
|---|---|---|---|---|
| 2020/0373969 | A1* | 11/2020 | Tsai | H04W 74/0833 |
| 2021/0051733 | A1* | 2/2021 | Lee | H04B 7/0619 |
| 2021/0282111 | A1* | 9/2021 | Yamada | H04B 7/0695 |

FOREIGN PATENT DOCUMENTS

| | | | |
|---|---|---|---|
| KR | 20190008513 | A | 1/2019 |
| KR | 20190028334 | A | 3/2019 |
| WO | 2019030390 | A1 | 2/2019 |
| WO | 2019032466 | A1 | 2/2019 |

OTHER PUBLICATIONS

3GPP TS 36.101 V16.4.0 (Dec. 2019), 3rd Generation Partnership Project; Technical Specification Group Radio Access Network; Evolved Universal Terrestrial Radio Access (E-UTRA); User Equipment (UE) radio transmission and reception(Release 16), 1882 pages.

3GPP TS 36.213 V16.0.0 (Dec. 2019), 3rd Generation Partnership Project; Technical Specification Group Radio Access Network; Evolved Universal Terrestrial Radio Access (E-UTRA); Physical layer procedures(Release 16), 568 pages.

3GPP TS 36.321 V15.8.0 (Dec. 2019), 3rd Generation Partnership Project; Technical Specification Group Radio Access Network; Evolved Universal Terrestrial Radio Access (E-UTRA); Medium Access Control (MAC) protocol specification (Release 15), 134 pages.

3GPP TS 38.213 V16.0.0 (Dec. 2019), 3rd Generation Partnership Project; Technical Specification Group Radio Access Network; NR; Physical layer procedures for control(Release 16), 146 pages.

3GPP TS 38.321 V15.8.0 (Dec. 2019), 3rd Generation Partnership Project; Technical Specification Group Radio Access Network; NR; Medium Access Control (MAC) protocol specification(Release 15), 78 pages.

3GPP TS 38.211 V16.0.0 (Dec. 2019), 3rd Generation Partnership Project; Technical Specification Group Radio Access Network; NR; Physical channels and modulation(Release 16), 129 pages.

International Search Report and Written Opinion issued in PCT/CN2020/077498, dated Dec. 3, 2020, 9 pages.

Qualcomm Incorporated: "Power Ramping and Power Control for RACH Procedure", 3GPP Draft; R1-1713381, Aug. 20, 2017, XP051316186, total 8 pages.

ETRI: "Remaining issues on power ramping during RA procedure in NR", 3GPP Draft; R1-1713807, Aug. 20, 2017, XP051316605, total 6 pages.

Mediatek Inc: "Power ramping and power control during RA procedure", 3GPP Draft; R1-1713700, Aug. 20, 2017, XP051316499, total 4 pages.

Extended European Search Report issued in EP20923276.8, dated Nov. 29, 2022, 10 pages.

* cited by examiner

MESSAGE RETRANSMISSION METHOD AND RELATED APPARATUS

CROSS-REFERENCE TO RELATED APPLICATIONS

This application is a continuation of International Application No. PCT/CN2020/077498, filed on Mar. 2, 2020, which is incorporated herein by reference in its entirety.

TECHNICAL FIELD

This application relates to the field of wireless communication technologies, and in particular, to a message retransmission method and a related apparatus.

BACKGROUND

In 5G new radio (NR) wireless communication technologies, a carrier frequency used for communication is high (high frequency). For example, the carrier frequency exceeds 3 GHz or 6 GHz. A higher carrier frequency indicates a greater loss (path loss) of radio signals during transmission. In view of this, a new antenna technique with higher antenna gains is used, to increase a distance and efficiency of signal transmission.

However, during transmission of radio signals over a medium, the propagation medium obtains energy from the radio signals while the radio signals are attenuated during transmission over the medium, causing a change in physical characteristics of the medium, for example, a temperature rise. Especially, when radio signals pass through a creature, if energy or energy density of the radio signals is excessively high, biometric features are affected. In view of this, the regulatory authority formulates security standards for electromagnetic propagation, to constraint a maximum allowed transmit power, a total radiated power (TRP), an equivalent isotropic radiated power (EIRP), and the like of user equipment (UE). All the indicators such as the EIRP, the maximum allowed transmit power, and the TRP are collectively referred to as maximum permissible exposures (MPE).

In actual communication, the MPE is greatly restricted because a human body is close to the UE. Even if the UE can support a larger EIRP, a lower EIRP is used for signal transmission due to security requirements. For example, in a process of accessing a network, when transmitting a message to a network device, the UE transmits the message at a power that meets the MPE constraint. As a result, an output power of the UE is severely limited, signal transmission is prone to fail, the UE cannot access the network, or an access delay is large.

SUMMARY

This application provides a message retransmission method and a related apparatus, to improve a transmit power of user equipment.

According to a first aspect, an embodiment of this application provides a message retransmission method. The method includes: User equipment sends a first message to a network device at a first power using a first spatial filter; and the user equipment retransmits the first message to the network device using N second spatial filters.

The first message is a message sent by the user equipment to the network device in a random access process. The first message is a message 1, a message 3, or a physical uplink control channel (PUCCH). When the user equipment confirms that the first message needs to be retransmitted, for example, when the first message is unsuccessfully sent or the random access fails, the user equipment retransmits the first message to the network device using the N second spatial filters.

One second spatial filter may correspond to one beam direction, or one second spatial filter may correspond to a plurality of beam directions. The user equipment may retransmit the first message to the network device in n different beam directions using the N second spatial filters, where n is a positive integer greater than or equal to 2, and n≥N. The N second spatial filters include at least one spatial filter different from the first spatial filter, or the n beam directions include at least one beam direction different from a beam direction corresponding to the first spatial filter. When the first message is unsuccessfully sent or the random access fails, the user equipment switches to retransmit the first message in a plurality of beam directions. This helps increase a total transmit power of the first message, increase a probability of successfully sending the first message, and accelerate the user equipment to access a network.

There is one second spatial filter in the N second spatial filters that is the same as the first spatial filter, or there is one beam direction in the n beam directions that is the same as a beam direction in which the first message is sent using the first spatial filter. In this way, the beam direction corresponding to the first spatial filter may be a beam direction having highest efficiency and a lowest path loss. In this case, the user equipment continues to retransmit the first message in the beam direction, so that a receive power of the first message for the network device can be increased.

Alternatively, any one of the N second spatial filters is different from the first spatial filter, or any one of the n beam directions is different from the beam direction in which the first message is sent using the first spatial filter. In this way, the user equipment can attempt to retransmit the first message to the network device in more beam directions, increasing a probability of successfully sending the first message.

In some implementations, N is 1, and n>N. To be specific, the user equipment retransmits the first message to the network device in n different beam directions using one second spatial filter. The one second spatial filter corresponds to the n beam directions.

In some other implementations, N>1, and n>N. At least one of the N second spatial filters is used to retransmit the first message to the network device in a plurality of different beam directions. In other words, at least one of the N second spatial filters corresponds to the plurality of beam directions.

In still other implementations, N≥2, and N=n. Each of N second spatial filters corresponds to one beam direction, and beam directions in which the first message is sent using all of the N second spatial filters are different. The user equipment separately retransmits the first message to the network device in N different beam directions using the N second spatial filters.

Further, if the first message is still unsuccessfully sent after the user equipment retransmits the first message to the network device using the N second spatial filters, the user equipment may retransmit the first message again.

In some implementations, the first message is the message 1. A second power ramping counter corresponding to a transmit power of each of P second spatial filters in the N second spatial filters is greater than a first power ramping counter corresponding to the first power, where P is a positive integer, and P≤N.

In the foregoing solution, when the message 1 is unsuccessfully sent or the random access fails, the user equipment switches to retransmit the message 1 in n beam directions, and performs power ramping in beam directions corresponding to the P second spatial filters in the n beam directions, to increase the transmit power of each of the P second spatial filters. This helps increase a total power of the N second spatial filters, and increase a probability of successfully sending the message 1.

Optionally, if the user equipment unsuccessfully retransmits the message 1, the user equipment may retransmit the message 1 again using N third spatial filters, where N'≥N. Power ramping may not be performed on the N' third spatial filters, that is, a power ramping counter corresponding to transmit powers of the N' third spatial filters is equal to the second power ramping counter.

Based on the foregoing implementation in which the first message is the message 1, in some implementations, the first power is determined based on a first power ramping step and the first power ramping counter, and the transmit power of each of the P second spatial filters is determined based on a second power ramping step and the second power ramping counter that correspond to the transmit power of the second spatial filter.

Optionally, the second power ramping step is determined based on the first power ramping step. In this way, the network device configures only one power ramping step as the first power ramping step, so that radio transmission resources can be saved. In addition, the user equipment calculates the second power ramping step only once for the P second spatial filters, so that a data processing amount of the user equipment can be reduced.

Optionally, if P≥2, a second power ramping step a of a second spatial filter A of the P second spatial filters is determined based on configuration information sent by the network device. In the P second spatial filters, a second power ramping step of a second spatial filter other than the second spatial filter A is determined based on the second power ramping step a. In this way, the network device can better control the transmit power of the user equipment by configuring second power ramping steps of the P second spatial filters. The second spatial filter A is any one of the P second spatial filters.

Further, before the user equipment retransmits the message 1 to the network device using N second spatial filters, the method further includes: The user equipment obtains a path loss measurement value of each of the P second spatial filters. The path loss measurement value of each of the P second spatial filters is for determining a path loss value of each of the P second spatial filters. The path loss value of each of the P second spatial filters is for determining a transmit power for retransmitting the first message using the second spatial filter.

Path loss values of the P second spatial filters are the same, and the path loss values are determined by the user equipment based on path loss measurement values of the P second spatial filters. As for the second path loss value obtained in this way, the path loss measurement value of each of the P second spatial filters is considered, and the transmit power determined based on the second path loss value is appropriate.

Alternatively, path loss values of the P second spatial filters are different, and a path loss value of each of the P second spatial filters is determined based on the path loss measurement value of the second spatial filter. In this way, the second path loss value for calculating the transmit power of each second spatial filter can accurately reflect a path loss situation corresponding to the second spatial filter, so that the transmit power calculated by the user equipment can be more accurate.

Optionally, the path loss values of the P second spatial filters are the same, and the path loss value is minimum in the path loss measurement values of the P second spatial filters. Alternatively, the path loss value is any one of the path loss measurement values of the P second spatial filters that is less than a path loss threshold. In this way, the transmit power of the UE is not excessively high, and less interference arising from sending an uplink message by the UE is made on a network.

In some implementations, the first message is the message 3. A second accumulated power adjustment corresponding to each of P second spatial filters in the N second spatial filters is different from a first accumulated power adjustment corresponding to the first spatial filter. When the user equipment sends the message 3 switching from one beam direction to n beam directions, the user equipment adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the message 3.

In some implementations, the first message is the PUCCH. A second accumulated power adjustment corresponding to each of P second spatial filters in the N second spatial filters is different from a first accumulated power adjustment corresponding to the first spatial filter. When the user equipment sends the PUCCH switching from one beam direction to n beam directions, the user equipment adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the PUCCH.

In some implementations, if N≥2, synchronization signals associated with first messages sent using at least two of the N second spatial filters are different, physical broadcast channel blocks associated with the first messages sent using the at least two of the N second spatial filters are different, or channel state information-reference signal resources associated with the first messages sent using the at least two of the N second spatial filters are different. In this way, a coverage area of the first message can be increased, and a probability of successfully sending the first message can be increased. The first message is the message 1, the message 3, or the PUCCH.

In some implementations, before the user equipment retransmits the first message to the network device using the N second spatial filters, the method further includes: The user equipment confirms that a transmit power for retransmitting the first message using the first spatial filter exceeds a power threshold corresponding to a maximum permissible exposure. The power threshold is less than or equal to a maximum power corresponding to the maximum permissible exposure. In this way, when the first power is about to exceed or has exceeded the maximum power corresponding to the maximum permissible exposure, the user equipment switches to retransmit the first message to the network device in a plurality of beam directions, so that the total transmit power for sending the first message by the user equipment is greater than the first power. Therefore, the transmit power of the user equipment is not constrained by the maximum power corresponding to the maximum permissible exposure, the probability of successfully sending the first message is increased, and a network access speed of the user equipment can be increased. The first message is the message 1, the message 3, or the PUCCH.

According to a second aspect, an embodiment of this application provides a message retransmission device, including a transceiver unit and a processing unit. The transceiver unit is configured to: send a first message to a network device at a first power using a first spatial filter, and retransmit the first message to the network device using N second spatial filters. The N second spatial filters include at least one spatial filter different from the first spatial filter, and N is a positive integer. The first message is a message sent by the user equipment to the network device in a random access process. The first message is a message 1, a message 3, or a PUCCH. When the first message is unsuccessfully sent or the random access fails, the user equipment switches to retransmit the first message in a plurality of beam directions. This helps increase a total transmit power of the first message, and increase a probability of successfully sending the first message.

In some implementations, the first message is the message 1. A second power ramping counter corresponding to a transmit power of each of P second spatial filters in the N second spatial filters is greater than a first power ramping counter corresponding to the first power, where P is a positive integer, and P≤N.

In the foregoing solution, when the message 1 is unsuccessfully sent or the random access fails, the message 1 is switched to be retransmitted in n beam directions, and power ramping is performed in beam directions corresponding to the P second spatial filters in the n beam directions, to increase the transmit power of each of the P second spatial filters. This helps increase a total power of the N second spatial filters, and increase a probability of successfully sending the message 1.

The message retransmission device in this implementation may be, for example, the user equipment, or may be a chip or a functional module of the user equipment.

Optionally, the transceiver unit includes a receiving unit and a transmitting unit. In an embodiment, the message retransmission device is a communication chip, and the transceiver unit may be an input/output circuit or a port of the communications chip.

In another embodiment, the transceiver unit may be a transmitter and a receiver.

Based on the foregoing implementation in which the first message is the message 1, in some implementations, the first power is determined by the processing unit based on a first power ramping step and the first power ramping counter, and the transmit power of each of the P second spatial filters is determined by the processing unit based on a second power ramping step and the second power ramping counter that correspond to the transmit power of the second spatial filter.

Optionally, the second power ramping step is determined by the processing unit based on the first power ramping step. In this way, the network device configures only one power ramping step as the first power ramping step, so that radio transmission resources can be saved. In addition, the user equipment calculates the second power ramping step only once for the P second spatial filters, so that a data processing amount of the user equipment can be reduced.

Optionally, if P≥2, a second power ramping step a of a second spatial filter A of the P second spatial filters is determined by the processing unit based on configuration information sent by the network device. In the P second spatial filters, a second power ramping step of a second spatial filter other than the second spatial filter A is determined by the processing unit based on the second power ramping step a. In this way, the network device can better control the transmit power of the user equipment by configuring second power ramping steps of the P second spatial filters. The second spatial filter A is any one of the P second spatial filters.

Further, the processing unit is configured to obtain a path loss measurement value of each of the P second spatial filters. The path loss measurement value of each of the P second spatial filters is for determining a path loss value of each of the P second spatial filters. The path loss value of each of the P second spatial filters is for determining a transmit power for retransmitting the first message using the second spatial filter.

Path loss values of the P second spatial filters are the same, and the path loss values are determined by the processing unit based on the path loss measurement values of the P second spatial filters. As for the second path loss value obtained in this way, the path loss measurement value of each of the P second spatial filters is considered, and the transmit power determined based on the second path loss value is appropriate.

Alternatively, path loss values of the P second spatial filters are different, and a path loss value of each of the P second spatial filters is determined by the processing unit based on the path loss measurement value of the second spatial filter. In this way, the second path loss value for calculating the transmit power of each second spatial filter can accurately reflect a path loss situation corresponding to the second spatial filter, so that the transmit power calculated by the user equipment can be more accurate.

Optionally, the path loss values of the P second spatial filters are the same, and the path loss value is minimum in the path loss measurement values of the P second spatial filters. Alternatively, the path loss value is any one of the path loss measurement values of the P second spatial filters that is less than a path loss threshold. In this way, interference made on a network can be balanced.

In some implementations, the first message is the message 3. A second accumulated power adjustment corresponding to each of P second spatial filters in the N second spatial filters is different from a first accumulated power adjustment corresponding to the first spatial filter. When the user equipment sends the message 3 switching from one beam direction to n beam directions, the user equipment adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the message 3.

In some implementations, the first message is the PUCCH. A second accumulated power adjustment corresponding to each of P second spatial filters in the N second spatial filters is different from a first accumulated power adjustment corresponding to the first spatial filter. When the user equipment sends the PUCCH switching from one beam direction to n beam directions, the user equipment adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the PUCCH.

In some implementations, if N≥2, synchronization signals associated with first messages sent using at least two of the N second spatial filters are different, physical broadcast channel blocks associated with the first messages sent using the at least two of the N second spatial filters are different, or channel state information-reference signal resources associated with the first messages sent using the at least two of the N second spatial filters are different. In this way, a coverage area of the first message can be increased, and a probability of successfully sending the first message can be increased. The first message is the message 1, the message 3, or the PUCCH.

In some implementations, the processing unit is further configured to confirm that a transmit power for retransmitting the first message using the first spatial filter exceeds a power threshold corresponding to a maximum permissible exposure. The power threshold is less than or equal to a maximum power corresponding to the maximum permissible exposure. In this way, when the first power is about to exceed or has exceeded the maximum power corresponding to the maximum permissible exposure, the user equipment switches to retransmit the first message to the network device in a plurality of beam directions, so that the total transmit power for sending the first message by the user equipment is greater than the first power. Therefore, the transmit power is not constrained by the maximum power corresponding to the maximum permissible exposure, the probability of successfully sending the first message is increased, and a network access speed of the user equipment can be increased. The first message is the message 1, the message 3, or the PUCCH.

It should be noted that the supplementary description of the message retransmission method in the implementations of the first aspect is also applicable to the message retransmission device in the implementations of the second aspect.

According to a third aspect, an embodiment of this application provides a communication device. The communication device is user equipment or a terminal device, and includes a processor and a memory. The memory is configured to store computer instructions. The processor executes a computer program or the instructions in the memory, so that the method in any one of the implementations of the first aspect is performed.

According to a fourth aspect, an embodiment of this application further provides a communication device. The communication device includes a processor, a memory, and a transceiver. The transceiver is configured to receive a signal or send a signal. The memory is configured to store program code. The processor is configured to invoke the program code from the memory to perform the method in the first aspect. The memory is configured to store a computer program or instructions. The processor is configured to invoke the computer program or the instructions from the memory and run the computer program or the instructions. When the processor executes the computer program or the instructions in the memory, the communication device is enabled to perform any one of the implementations of the message retransmission method in the first aspect.

Optionally, there are one or more processors, and there are one or more memories.

Optionally, the memory may be integrated with the processor, or the memory and the processor are disposed separately.

Optionally, the transceiver may include a transmitter and a receiver.

According to a fifth aspect, an embodiment of this application provides an apparatus. The apparatus includes a processor, and the processor is coupled to a memory. When the processor executes a computer program or instructions in the memory, the method in any one of the implementations of the first aspect is performed. Optionally, the apparatus further includes the memory. Optionally, the apparatus further includes a communication interface, and the processor is coupled to the communication interface.

In an implementation, the apparatus is user equipment. When the communication device is the user equipment, the communication interface may be a transceiver or an input/output interface. Optionally, the transceiver may be a transceiver circuit. Optionally, the input/output interface may be an input/output circuit.

In another implementation, an embodiment of the apparatus is a chip or a chip system. When the apparatus is the chip or the chip system, the communication interface may be an input/output interface, an interface circuit, an output circuit, an input circuit, a pin, a related circuit, or the like on the chip or in the chip system. The processor may also be embodied as a processing circuit or a logic circuit.

According to a sixth aspect, an embodiment of this application provides a communication device. The communication device includes a processor and an interface circuit. The interface circuit is configured to receive code instructions and transmit the code instructions to the processor. The processor runs the code instructions to perform the corresponding method in the first aspect.

According to a seventh aspect, an embodiment of this application provides a system, and the system includes the foregoing user equipment and the foregoing network device.

According to an eighth aspect, an embodiment of this application provides a computer program product. The computer program product includes a computer program (which may also be referred to as code or instructions). When the computer program is run, a computer is enabled to perform the method in any one of the possible implementations of the first aspect.

According to a ninth aspect, an embodiment of this application provides a computer-readable storage medium. The computer-readable medium stores a computer program (which may also be referred to as code or instructions). When the computer program is run on a computer, the computer is enabled to perform the method in any one of the possible implementations of the first aspect.

According to a tenth aspect, an embodiment of this application provides a communication device, including an input circuit, an output circuit, and a processing circuit. The processing circuit is configured to receive a signal using the input circuit, and transmit a signal using the output circuit, so that the method in any one of the possible implementations of the first aspect is implemented.

In a specific implementation process, the communication device may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit or the output circuit at different moments. Specific implementations of the processing circuit and various circuits are not limited in this application.

According to an eleventh aspect, an embodiment of this application further provides a chip, including a processor and an interface, configured to execute a computer program or instructions stored in a memory, to perform the message retransmission method in any one of the foregoing implementations.

BRIEF DESCRIPTION OF DRAWINGS

To describe technical solutions in embodiments of this application or the conventional technology more clearly, the following briefly describes the accompanying drawings used in description of embodiments.

DESCRIPTION OF EMBODIMENTS

The technical solutions according to embodiments of this application are clearly described in the following with reference to the accompanying drawings. In the present disclosure, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the present disclosure, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In present disclosure, unless otherwise stated, "a plurality of" means two or more than two.

Figure 1:
FIG. 1 is a diagram of a network architecture of a network system according to an embodiment of this application.

FIG. 1 is a diagram of a network architecture of a network system 100 according to an embodiment of this application.

The network system includes a network device 10 and UE 20.

The network device 10 is a device that is in an access network and that communicates with wireless user equipment via one or more cells. For example, the network device may be an evolved NodeB (NodeB, eNB, or e-NodeB) in a long term evolution (LTE) system or long term evolution-advanced (LTE-A), or may be a new radio network device gNB in a 5th generation (5G) mobile communication technology NR system.

The UE 20 may be a device that provides users with voice and/or data connectivity, for example, may be a handheld device having a wireless connection function, or a processing device connected to a wireless modem. The user equipment may communicate with a core network via a radio access network (RAN), and exchange voice and/or data with the RAN. The UE 20 may be wireless user equipment, mobile user equipment, device-to-device (D2D) communication user equipment, vehicle-to-everything (V2X) user equipment, machine-to-machine/machine-type communications (M2M/MTC) user equipment, Internet of things (IoT) user equipment, a subscriber unit, a subscriber station, a mobile station, a remote station, an access point (AP), a remote terminal, and an access terminal, a user terminal, a user agent, a user device, or the like. For example, the UE 20 may be a mobile phone (or referred to as a "cellular" phone), a computer having mobile user equipment, a portable, pocket-sized, handheld, computer-built-in mobile apparatus, or the like. For example, the UE 20 may be a device such as a personal communications service (PCS) phone, a cordless telephone set, a session initiation protocol (SIP) phone, a wireless local loop (WLL) station, or a personal digital assistant (PDA). The UE 20 may alternatively include a limited device, for example, a device having low power consumption, a device having a limited storage capability, or a device having a limited computing capability. For example, the UE 20 is an information sensing device such as a barcode, radio frequency identification (RFID), a sensor, a global positioning system (GPS), or a laser scanner.

By way of example, and not limitation, in embodiments of this application, the UE 20 may alternatively be a wearable device. The wearable device may also be referred to as a wearable intelligent device, an intelligent wearable device, or the like, and is a generic term for wearable devices that are developed by applying wearable techniques to intelligent designs of daily wear, such as glasses, gloves, watches, clothes, and shoes. The wearable device is a portable device that can be directly worn on a body or integrated into clothes or an accessory of a user. The wearable device is not merely a hardware device. Moreover, the wearable device implements powerful functions through software support, data exchange, and cloud interaction. In a broad sense, wearable intelligent devices include full-featured and large-sized devices that can implement all or some functions without depending on smartphones, for example, smart watches or smart glasses, and include devices that dedicated to only one type of application function and collaboratively work with other devices such as smartphones, for example, various smart bands, smart helmets, or smart jewelry for monitoring physical signs.

If the user equipment described above are located on vehicles (for example, placed or installed in the vehicles), they may be considered as in-vehicle user equipment. For example, in-vehicle user equipment is also referred to as an on-board unit (OBU). This is not limited in embodiments of this application.

Random access (RA) is an information exchange mechanism or an exchange process in which a device (for example, UE) that has not accessed a network establishes a connection to the network in an LTE or 5G access control communication system. There are two types of random access: contention-based random access and contention-free random access.

The contention-based random access is 4-step random access, and each step corresponds to a message: a message 1 (Msg1), a message 2 (Msg2), a message 3 (Msg3), and a message 4 (Msg4). The messages separately carry different signaling or information. The contention-free random access is 2-step random access, which includes only the first two steps.

Figure 2:
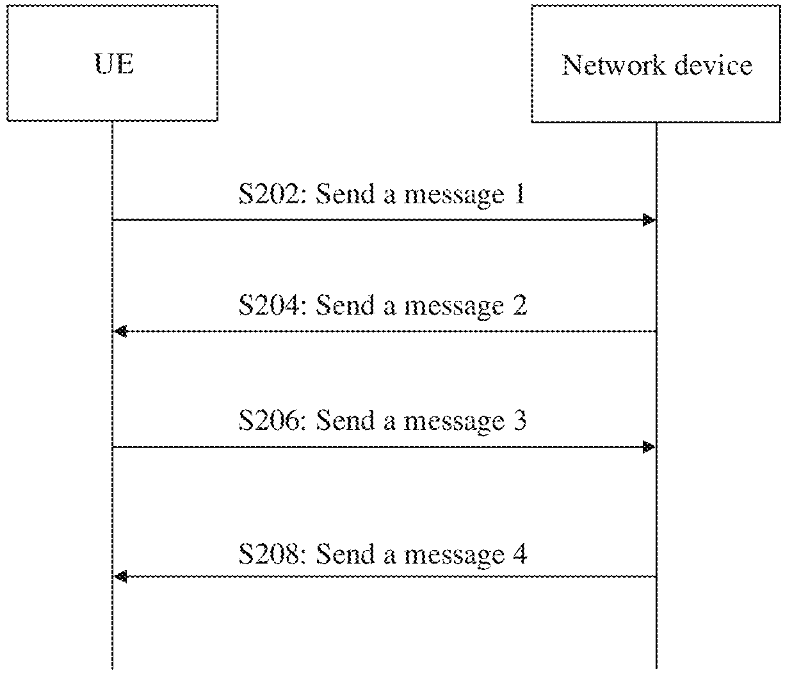
FIG. 2 is a schematic flowchart of a random access process of UE according to this application.

FIG. 2 is a schematic flowchart of a random access process of UE according to an embodiment. The random access process of the UE includes the following steps:

S202: The UE sends a message 1 to a network device.

S204: The network device sends a message 2 to the UE.

S206: The UE sends a message 3 to the network device.

S208: The network device sends a message 4 to the UE.

In this embodiment, the message 1 is a random access preamble (preamble or sequence). The message 1 is carried on a physical random access channel (PRACH). The message 1 is used by a device (for example, the UE) that is to access a network to initiate a connection request, a handover request, a synchronization request, or a scheduling request to the network device.

The message 2 is a random access response (RAR) message. The message 2 is a response to the message 1 received by the network device. The message 2 includes at least one of the following information: an index (random access preamble identifier, RAPID) of the message 1, an uplink grant, timing advance, a temporary cell radio network temporary identifier (TC-RNTI), or the like. Specifically, the network device may respond to a plurality of Msg1s via a same message 2.

The message 3 is also referred to as first uplink scheduling transmission. The message 3 is transmitted using the UL grant scheduled in the message 2, or is retransmitted based on TC-RNTI scrambled downlink control information (DCI) scheduling scrambled. Transmission content in the message 3 is a higher layer message, for example, a connection setup request message. The connection setup request message may be specifically identification information of a user that initiates a connection request. The message 3 is for contention resolution. If a plurality of different devices use a same message 1 for random access, whether there is a collision between the plurality of different devices is determined based on both the message 3 and the message 4.

The message 4 is for contention resolution. The message 4 generally includes a common control channel service data unit (CCCH SDU) carried in the Msg3. If the network device detects, in the message 4, a CCCH SDU sent by the network device, it is considered that the contention-based random access succeeds, and a subsequent communication process is to be performed.

To reduce a period of time for access in the contention-based random access, a 2-step random access solution is used. A message A and a message B are to be used in the 2-step random access solution. The message A includes a random access preamble and 1st data information (for example, which are similar to the message 1 and the message 3 respectively). The message B includes contention resolution and uplink scheduling (for example, which are similar to the message 2 and the message 4 in the four-step contention-based random access).

Further, when successfully receiving the message 4, the UE may send a PUCCH to the network device, to feed back whether the message 4 is successfully received.

A transmit power is an output power measured on all or a part of supported frequencies, frequency bands, or bandwidths within a given period of time or a given periodicity. For example, the period of measurement time is at least 1 ms. For another example, the period of measurement time is at least one slot corresponding to a subcarrier spacing.

Figure 3A:
FIG. 3A is a schematic diagram of a scenario in a random access process of UE.

However, the transmit power of the UE is constrained as the transmit power is subject to MPE. FIG. 3A is a schematic diagram of a scenario in a random access process of UE according to an embodiment. In FIG. 3A, a dashed-line beam of UE 31 represents an MPE-constrained maximum transmit power of the UE. In this way, when the UE 31 sends, under an MPE constraint, a message 1, a message 3, or a PUCCH to a network device 32, sending of the message 1, the message 3, or the PUCCH may fail. In this case, the UE needs to perform multiple retransmissions, causing a long access time of the UE.

Particularly, for some carrier frequency locations, the MPE constraint of the UE further includes an equivalent isotropic radiated power (EIRP). For example, when a carrier frequency is greater than 3 GHz, a constraint of the transmit power may be an output power, the EIRP, or the output power and the EIRP (each of them corresponds to a different constraint value). For example, in the case of a carrier frequency lower than 3 GHz, the output power does not exceed 23 dBm. For another example, in the case of a carrier frequency higher than 3 GHz, the output power does not exceed 23 dBm and the EIRP does not exceed 43 dBm. For details about an MPE constraint value, see the rules formulated by various countries and regions.

A "transmit power" in this application may be an output power or an EIRP.

Figure 3B:
FIG. 3B is a schematic diagram of a scenario of a message retransmission method according to an embodiment of this application.

An embodiment of this application provides a message retransmission method. In this embodiment, UE sends a first message at a first power using a first spatial filter. The first message is sent by the UE to a network device in a random access process. The first message is a message 1, a message 3, or a PUCCH. When the UE unsuccessfully sends the first message at the first power, the UE retransmits the first message in n beam directions using N spatial filters, where N and n are positive integers, $n \geq 2$, and $n \geq N$. FIG. 3B is a schematic diagram of a scenario of a message retransmission method according to an embodiment of this application. As shown in FIG. 3B, the UE 31 sends the first message to the network device 32 in a plurality of beam directions. In this way, when unsuccessfully transmitting the first message, the UE switches to send the first message in the plurality of beam directions. This increases a total transmit power for sending the first message by the UE, increases a probability of successfully sending the first message, and accelerates network access for the UE.

Figure 4:
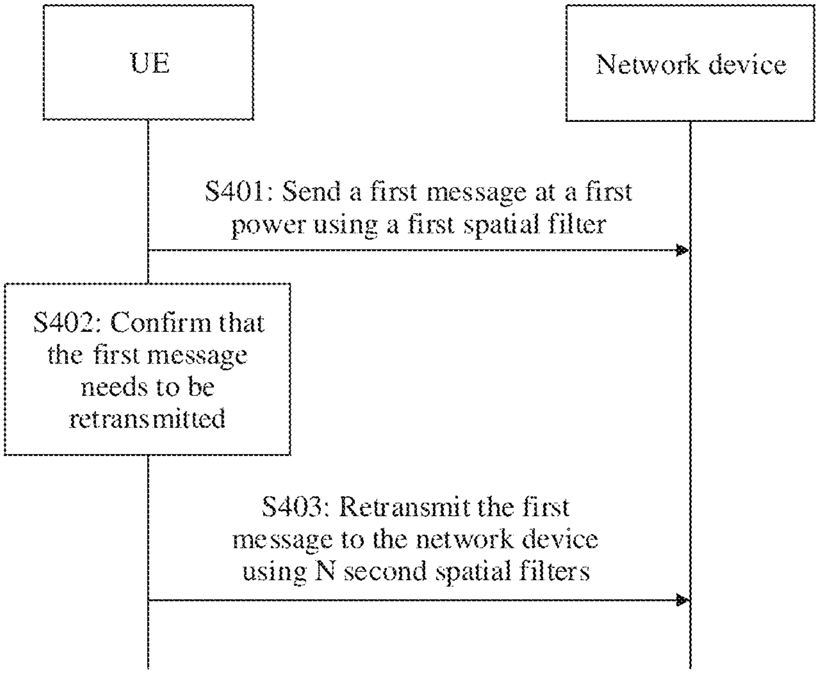
FIG. 4 is a schematic flowchart of a message retransmission method according to an embodiment of this application.

FIG. 4 is a schematic flowchart of a message retransmission method according to an embodiment of this application. The message retransmission method includes the following steps:

S401: UE sends a first message to a network device at a first power using a first spatial filter.

In this embodiment, the UE sends the first message to the network device in one beam direction using the first spatial filter. The first message is a message 1, a message 3, or a PUCCH.

The first power is an output power on all or a part of frequencies, frequency bands, or bandwidths supported by the UE within a specified time period. For example, the specified time period may correspond to a time period greater than or equal to 1 ms, for example, is (s).

S402: The UE confirms that the first message needs to be retransmitted.

When the first message is the message 1, the UE monitors a physical downlink control channel (PDCCH) after sending the first message. If the UE does not receive, within a specified RAR window, an RAR sent by the network device, the UE may confirm that the first message is unsuccessfully sent, and confirm that the message 1 needs to be retransmitted. If the UE confirms that random access fails, the UE may also confirm that the message 1 needs to be retransmitted.

In this embodiment, in a random access process, a random access failure may be caused due to any one or more of the following factors: the network device fails to detect the message 1, the UE fails to receive a message 2, the network device fails to detect the message 3, the UE fails to detect a message 4, and the UE detects that the message 4 is successfully sent but fails in conflict detection.

When the first message is the message 3, if the UE confirms that the message 3 is unsuccessfully sent, the UE confirms that the message 3 needs to be retransmitted.

When the first message is the PUCCH, if the UE confirms that the PUCCH is unsuccessfully sent, the UE confirms that the PUCCH needs to be retransmitted.

S403: The UE retransmits the first message to the network device using N second spatial filters, where N is a positive integer.

Beams are communication resources. A technology for forming a beam may be a beamforming technology or another technical means. The beamforming technology may be specifically a digital beamforming technology, an analog beamforming technology, or a hybrid digital/analog beamforming technology. A transmit beam may refer to signal strength distribution formed in different directions in space after a signal is transmitted via antennas.

Signal strength distribution of a transmit beam of the UE formed in different directions in space after a signal is transmitted via antennas may have a plurality of beam directions, and each beam direction may correspond to one or more antenna ports.

It may be understood that the one or more antenna ports corresponding to one beam direction may also be considered as one antenna port set. A beam may be embodied as a spatial filter in a communication protocol. For example, one beam direction of a transmit beam may correspond to one spatial filter (spatial domain transmission filter), or a plurality of beam directions correspond to one spatial filter.

The UE may retransmit the first message to the network device in n different beam directions using the N second spatial filters, where n is a positive integer greater than or equal to 2, and n≥N. One second spatial filter corresponds to one or more beam directions.

When the first message is unsuccessfully sent or the random access fails, the user equipment switches to retransmit the first message in a plurality of beam directions. This can increase a total transmit power of the first message, and increase a probability of successfully sending the first message. For example, the UE retransmits the first message in a plurality of beam directions, so that a sum of transmit powers of the N second spatial filters is greater than the first power.

The N second spatial filters include at least one spatial filter different from the first spatial filter, or the n beam directions include at least one beam direction different from the beam direction in which the UE sends the first message using the first spatial filter.

Each second spatial filter may be understood as a group of weight values, and the group of weight values may include at least one of the following values: a digital weight value F, an analog weight value G, and a hybrid weight value FG of the analog weight value and the digital weight value. That an antenna of the UE retransmits the first message to the network device in the n different beam directions using the N second spatial filters may be understood as: The antenna of the UE retransmits the first message to the network device in the n different beam directions based on N groups of weight values. Each group of weight values may correspond to one or more beam directions.

Figure 5A:
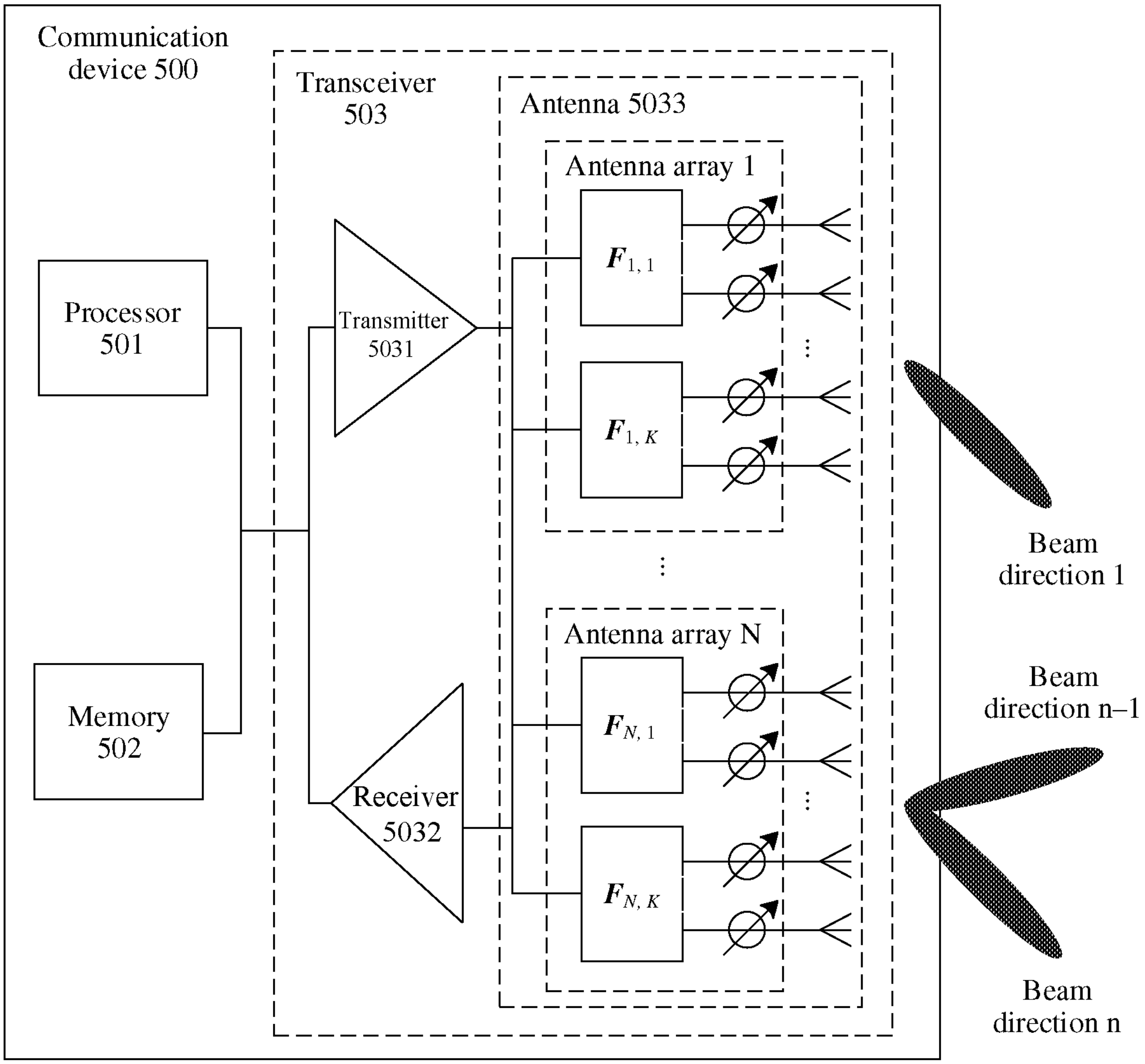
FIG. 5A is a schematic diagram of a structure of a communication device according to an embodiment of this application.

FIG. 5A is a schematic diagram of a structure of a communication device according to an embodiment of this application. The communication device 500 includes a processor 501, a memory 502, and a transceiver 503. The processor 501 is coupled to the memory 502. The memory 502 is configured to store computer instructions. The transceiver 503 includes one or more of the following components: a transmitter 5031, a receiver 5032, and an antenna 5033. The transmitter 5031 may be configured to send information to a network device via the antenna 5033. The receiver 5032 is configured to receive information via the antenna 5033. Optionally, there are one or more processors 501, and one or more memories 502. Optionally, the memory 502 may be integrated with the processor 501, or the memory 502 and the processor 501 are disposed separately.

The message retransmission method in embodiments of this application may be implemented by the communication device 500 in this embodiment. In other words, the foregoing steps S401 to S403 may be performed by the communication device 500 in this embodiment. The transceiver 503 is configured to perform sending and receiving operations in the method embodiments. The processor 501 is configured to implement operations other than the sending and receiving operations. The memory 502 is configured to store a related computer program or instructions. For example, the processor 501 reads the computer instructions from the memory 502, and the communication device 500 is enabled to perform the following operations: The transmitter 5031 sends a first message to the network device at a first power using a first spatial filter, the processor 501 confirms that the first message needs to be retransmitted, and the transmitter 5031 retransmits the first message to the network device using N second spatial filters.

The communication device 500 in this embodiment may be, for example, but is not limited to, user equipment, or a chip or a functional module in the user equipment.

The antenna 5033, 5033' includes one or more antenna arrays. For example, in FIGS. 5A and 5C, the antenna 5033 includes an antenna array 1 to an antenna array N, and in FIG. 5B, the antenna 5033' includes one antenna array. One antenna array includes K antenna elements. The antenna array may also be referred to as an antenna panel. One antenna array may send the first message in one beam direction, or one antenna array may send a signal in a plurality of beam directions. One spatial filter may be understood as a digital weight value F, an analog weight value G, or a hybrid weight value FG of the analog weight value and the digital weight value that is of one antenna array for beamforming. For example, in FIG. 5A, the antenna array 1 forms a beam using a digital weight value $[F_{1,1}; \ldots; F_{1,K}]$, and $[F_{1,1}; \ldots; F_{1,K}]$ is a spatial filter $F_1$. When an antenna array sends information to the network device in one beam direction, a spatial filter corresponding to the antenna array corresponds to the one beam direction.

When an antenna array sends information to the network device in a plurality of beam directions, the spatial filter corresponding to the antenna array corresponds to the plurality of beam directions.

In some embodiments, N>1, and n>N. At least one of the N second spatial filters retransmits the first message in a plurality of different beam directions. In other words, at least one of the N second spatial filters corresponds to the plurality of beam directions. As shown in FIG. 5A, the antenna array 1 retransmits the first message in a beam direction 1 using the second spatial filter $F_1$, . . . , and the antenna array N of the communication device 500 retransmits the first message in a beam direction n−1 and a beam direction n using a second spatial filter $F_N$, where $F_1=[F_{1,1}; \ldots ; F_{1,K}]$, . . . , and $F_N=[F_{N,1}; \ldots ; F_{N,K}]$.

Figure 5B:
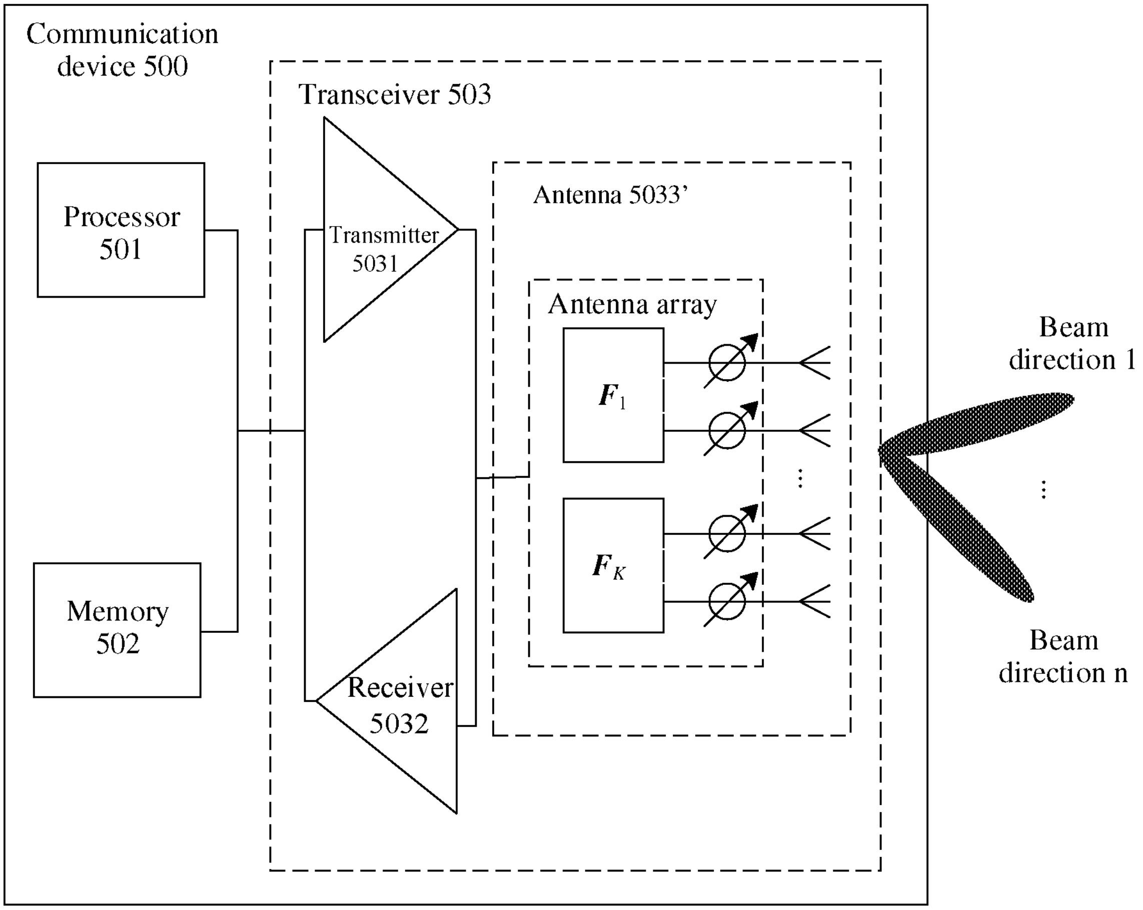
FIG. 5B is another schematic diagram of a scenario of a message retransmission method according to an embodiment of this application.

In some embodiments, N is 1, and n>N. The communication device 500 retransmits the first message in n different beam directions using one second spatial filter. FIG. 5B is another schematic diagram of a scenario of a message retransmission method according to an embodiment of this application. One antenna array of the communication device 500 retransmits the first message in n different beam directions using one second spatial filter F, where $F=[F_1, \ldots , F_k]$.

Figure 5C:
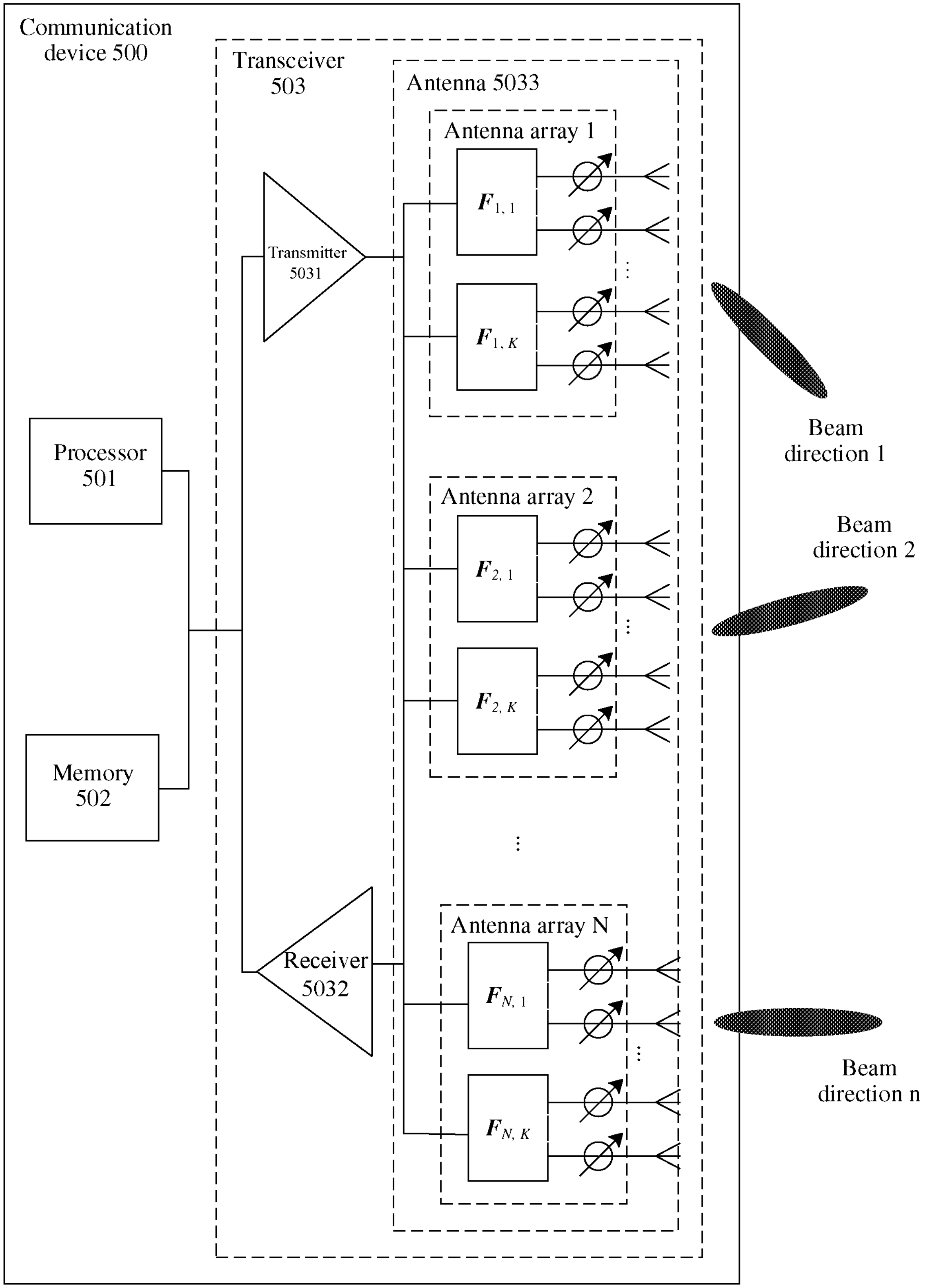
FIG. 5C is still another schematic diagram of a scenario of a message retransmission method according to an embodiment of this application.

In some other embodiments, N>1, and N=n. The N second spatial filters one-to-one correspond to N beam directions. The UE retransmits the first message in the N different beam directions using the N second spatial filters. FIG. 5C is another schematic diagram of a scenario of a message retransmission method according to an embodiment of this application. An antenna array 1 retransmits the first message in a beam direction 1 using a second spatial filter $F_1$; an antenna array 2 retransmits the first message in a beam direction 2 using a second spatial filter $F_2$, . . . , and an antenna array N of the communication device 500 retransmits the first message in a beam direction N using a second spatial filter $F_N$. $F_1=[F_{1,1}; \ldots ; F_{1,K}]$, $F_2=[F_{2,1}; \ldots ; F_{2,K}]$, . . . , and $F_N=[F_{N,1}; \ldots ; F_{N,K}]$.

It should be noted that the examples in the foregoing embodiments are merely used for explanation and description, and do not constitute any limitation on this application.

Synchronization signals (SSs) associated with first messages sent in at least two of the n beam directions are different, physical broadcast channel blocks (PBCH blocks) associated with the first messages sent in at least two of the n beam directions are different, or channel state information-reference signals (CSI-RSs) associated with the first messages sent in at least two of the n beam directions are different. In this way, a coverage area of the first message can be increased, and a probability of successfully sending the first message can be increased.

Optionally, SSs/PBCH blocks associated with the first messages sent in at least two of the n beam directions are the same. In this way, fewer SSs/PBCH blocks associated with the first message are sent in the n beam directions, and the network device detects the first message from the associated SSs/PBCH blocks, facilitating detection of the first message by the network device.

Optionally, content of the first messages sent in the n beam directions is completely the same. In this way, signals in a plurality of directions may form quasi-coherent superposition or coherent superposition in space, to increase strength of a received signal and increase a probability of successfully sending the first message.

In some implementations, there is one second spatial filter in the N second spatial filters that is the same as the first spatial filter, or there is one beam direction in the n beam directions that is the same as the beam direction in which the UE sends the first message using the first spatial filter in step S401. In this way, in step S401, the beam direction corresponding to the first spatial filter may be a beam direction having highest efficiency and a lowest path loss. In this case, the UE continues to retransmit the first message in the beam direction, so that a receive power of the first message for the network device can be increased.

In some other implementations, any one of the N second spatial filters is different from the first spatial filter, or any one of the n beam directions is different from the beam direction in which the UE sends the first message using the first spatial filter in step S401. In this way, the UE can attempt to retransmit the first message to the network device in more beam directions, increasing a probability of successfully sending the first message.

Further, if the first message is still unsuccessfully sent after the UE retransmits the first message to the network device using the N second spatial filters, the UE may retransmit the first message again.

Specifically, for example, the UE sends the first message to the network device at the first power using the first spatial filter. When the UE confirms that the first message is unsuccessfully sent, the UE retransmits the first message to the network device in $n_1$ beam directions using $N_1$ second spatial filters, where $N_1$ and $n_1$ are positive integers, $n_1 \geq N_1$, and $n_1 \geq 2$. At least one of the $n_1$ beam directions is different from the beam direction in which the UE sends the first message using the first spatial filter in step S401.

If the UE confirms that the first message is unsuccessfully sent again, the UE retransmits the first message to the network device in $n_2$ beam directions using $N_2$ third spatial filters, where $N_2$ and $n_2$ are positive integers, $n_2 \geq N_2$, and $n_2 > n_1$. At least one of the $n_2$ beam directions is different from any one of the $n_1$ beam directions. It can be learned that when the UE confirms that the first message is unsuccessfully sent again, the UE may switch to retransmit the first message in more beam directions, so that a total power of the $N_2$ third spatial filters is greater than a total power of the $N_1$ second spatial filter. In this way, a total power of the first message can be further increased.

By analogy, when the UE unsuccessfully sends the first message to the network device in $n_i$ beam directions using $N_i$ $(i+1)^{th}$ spatial filters, the UE may retransmit the first message to the network device in beam directions using $N_{i+1}$ $(i+2)^{th}$ spatial filters. i, $N_{i+1}$, $n_{i+1}$, $N_i$, and $n_i$ are positive integers, $N_{i+1} \geq N_i$, and $n_{i+1} > n_i$. At least one of the beam directions is different from any one of the $n_i$ beam directions. In this way, the total transmit power for sending the first message by the UE can be increased, so that a total power of the $N_{i+1}$ $(i+2)^{th}$ spatial filters is greater than a total power of the $N_i$ $(i+1)^{th}$ spatial filters, to increase a probability of successful sending the message.

In some embodiments, in step S403, the UE sends the first message to the network device using the N second spatial filters and based on a codebook of the first message.

In this embodiment, the UE may send the first message to the network device in the n different beam directions using the N second spatial filters and based on the codebook of the first message. In other words, the UE sends the first message to the network device in each of the n beam directions based on the codebook of the first message. The codebook of the first message may be determined according to a communication protocol, or may be determined based on configuration information sent by the network device. In this way, signals in the plurality of beam directions can form coherent superposition in the network device, to increase a probability of successfully sending the first message, and accelerates network access for the UE.

Alternatively, in step S403, the UE may first determine an amplitude and a phase of sending the first message in each of the n beam directions, so that signals that are sent in the plurality of beam directions and that include the first message can form the coherent superposition at the receive end, to increase a probability of successfully sending the first message.

In some embodiments, in step S403, an output power and an EIRP corresponding to each of the N second spatial filters meet an MPE constraint, and a total output power and an EIRP corresponding to the N second spatial filters meet an MPE constraint.

In this embodiment, the first message may be a message 1, a message 3, or a PUCCH. The following separately describes manners of determining a second power in the case of the first message being the message 1, the message 3, or the PUCCH.

In some embodiments, the first message is the message 1. The first power is determined based on a first power ramping counter, a first power ramping step, and a first path loss value. It should be noted that, the first power is determined based on the first power ramping counter, the first power ramping step, and the first path loss value. However, this is not limited. The first power may alternatively be determined based on other parameters, in addition to the first power ramping counter, the first power ramping step, and the first path loss value. For example, the first power $P_{PRACH}$ may be obtained using the following formula:

$$P_{PRACH}=\min\{P_{CMAX,c}(i),\text{PREAMBLE\_RECEIVED\_TARGET\_POWER}+PL_c\}.$$

In this embodiment, PREAMBLE_RECEIVED_TARGET_POWER=preambleReceivedTargetPower+(PREAMBLE_POWER_RAMPING_COUNTER−1)×PREAMBLE_POWER_RAMPING_STEP+DELTA_PREAMBLE.

$P_{CMAX,c}(i)$ represents a maximum UE-allowable transmit power. PREAMBLE_RECEIVED_TARGET_POWER represents a preamble received target power. $PL_c$ represents a path loss, which corresponds to the first pass loss in this embodiment. preambleReceivedTargetPower represents an initial preamble received target power. DELTA_PREAMBLE represents a power offset corresponding to a random access preamble format. PREAMBLE_POWER_RAMPING_COUNTER represents a preamble power ramping counter, which corresponds to the first power ramping counter in this embodiment. PREAMBLE_POWER_RAMPING_STEP represents a preamble power ramping step, which corresponds to the first power ramping step in this embodiment.

The first power ramping counter and the ramping step may be determined by the UE based on the configuration information sent by the network device, or may be determined by the UE according to a communication protocol. The first path loss value is determined by the user equipment based on a path loss measurement value of a path loss reference signal received by the UE from the network device using a first spatial filter.

Specifically, in step S401, the UE sends the message 1 to the network device for a plurality of times in a first beam direction using the first spatial filter. Each time the sending fails, the UE may send, through power ramping, the message 1 again in the first beam direction. The first power ramping counter may be understood as a quantity of times for which the UE sends the message 1 in the first beam direction, or a quantity of times that power ramping is performed for sending the message 1. The first power ramping step may be understood as a ramping power. The first power may be understood as a power obtained through power ramping performed by the UE last time.

In step S402, the transmit power of each of the P second spatial filters in the N second spatial filters is determined based on at least one of the following three factors: a second power ramping counter and a second power ramping step that correspond to the transmit power of the second spatial filter, and a second path loss value of the second spatial filter. The second power ramping counter, the second power ramping step, and the second path loss value that correspond to each of the P second spatial filters may be understood as second power adjustment parameters for determining the second spatial filter. P is a positive integer, and P≤N.

It should be noted that the transmit power of each second spatial filter is determined based on the second power ramping counter, the second power ramping step, and the second path loss value that are of the second spatial filter. However, it is not limited that the transmit power of each second spatial filter is determined only based on the second power ramping counter, the second power ramping step, and the second path loss value. The second power adjustment parameters for determining the second power may further include parameters in addition to the second power ramping counter, the second power ramping step, and the second path loss value.

Second power adjustment parameters corresponding to all of the P second spatial filters may be the same or may be different. Any one of the P second spatial filters may correspond to one beam direction, or may correspond to a plurality of beam directions. If one of the P second spatial filters corresponds to a plurality of beam directions, a transmit power of the second spatial filter is a transmit power in any one of the beam directions.

Optionally, the UE may obtain a weighting factor of the second spatial filter based on a second power adjustment parameter of each of the P second spatial filters, and obtain a second power of the second spatial filter based on the weighting factor.

The second power ramping counter corresponding to a transmit power of each of the P second spatial filters is greater than the first power ramping counter.

In this embodiment, when the message 1 is unsuccessfully sent or random access fails, the user equipment switches to retransmit the message 1 in n beam directions, and performs power ramping in beam directions corresponding to the P second spatial filters in the n beam directions, to increase the transmit power of each of the P second spatial filters. This helps increase a total power of the N second spatial filters, and increase a probability of successfully sending the message 1.

Optionally, if the UE unsuccessfully retransmits the message 1, the UE may retransmit the message 1 again. When the UE retransmits the message 1 using N' third spatial filters, the UE may not perform power ramping on the N' third spatial filters. In other words, power ramping counters corresponding to transmit powers of the N' third spatial filters are equal to the second power ramping counters.

The second power ramping counter may be determined by the UE based on the configuration information sent by the network device, may be determined by the UE according to a communication protocol, or may be determined by the UE in another manner. For example, the UE may determine the second power ramping counter based on one or more of the following factors: a distance from an organism, the second path loss, and the second power ramping step. A manner of determining the second power ramping counter is not limited in embodiments of this application.

In some optional embodiments, a second power ramping step of at least one of the P second spatial filters is greater than the first power ramping step. In this way, the UE can ramp the second power to a greater extent, to increase a probability of successfully sending the message 1.

In some embodiments, second power ramping steps of all of the P second spatial filters are the same.

For example, the configuration information sent by the network device includes information indicating the first power ramping step. The UE obtains the first power ramping step based on the configuration information, and determines the second power ramping step based on the first power ramping step. The second power ramping step can be used to determine the transmit power corresponding to each of the P second spatial filters. In this way, the network device needs to configure only one power ramping step, so that less configuration information is configured by the network device, and radio transmission resources can be saved. In addition, the UE calculates the second power ramping step only once for the P second spatial filters, so that a data processing amount of the UE can be reduced.

For another example, the configuration information sent by the network device includes the information indicating the first power ramping step and information indicating the second power ramping step. The UE obtains the first power ramping step and the second power ramping step based on the configuration information. The first power ramping step is for determining the first power, and the second ramping step is for determining the transmit power corresponding to each of the P second spatial filters. In this way, the network device can better control the transmit power of the UE by configuring the second power ramping step of the P second spatial filters.

In some other embodiments, second power ramping steps of the P second spatial filters are different.

For example, the configuration information sent by the network device includes information indicating that a second power ramping step of one second spatial filter is a second power ramping step a. The UE obtains the second power ramping step a of one second spatial filter A of the P second spatial filters based on the configuration information, and determines a second power ramping step of a second spatial filter other than the second spatial filter A based on the second power ramping step a. The P second spatial filters correspond to P power ramping steps, and the second spatial filter A is any one of the P second spatial filters.

The $1^{st}$ second power ramping step is PREAMBLE_POWER_RAMPING_STEP_1, and PREAMBLE_POWER_RAMPING_STEP_1 is the second power ramping step a. The UE determines a $k^{th}$ second power ramping step PREAMBLE_POWER_RAMPING_STEP_k based on PREAMBLE_POWER_RAMPING_STEP_L where k=2, 3, . . . , P.

The $k^{th}$ second power ramping step PREAMBLE_POWER_RAMPING_STEP_k=k×PREAMBLE_POWER_RAMPING_STEP_1.

Alternatively, the $k^{th}$ second power ramping step is PREAMBLE_POWER_RAMPING_STEP_k=f(k)+PREAMBLE_POWER_RAMPING_STEP_1, where k=1, 2, . . . , P. For example, f(k)=k×alpha or f(k)=alpha×10×round(log 10(k)), where alpha is a constant determined by the UE based on the configuration information sent by the network device, or a step determined by the UE itself. Round indicates rounding off.

For another example, the configuration information sent by the network device includes information indicating the first power ramping step of the first spatial filter. The UE obtains the first power ramping step of the first spatial filter based on the configuration information, and then calculates, based on the first power ramping step, the second power ramping step corresponding to each of the P second spatial filters. In this way, the network device needs to configure only one power ramping step, so that less configuration information is configured by the network device, and radio transmission resources can be saved. In addition, the UE calculates the second power ramping step only once for the P second spatial filters, so that a data processing amount of the UE can be reduced. Specifically, a second power ramping step of a second spatial filter 1 of the P second spatial filters is the same as the first power ramping step. The UE determines a second power ramping step of another second spatial filter other than the second spatial filter 1 of the P second spatial filters based on the second power ramping step of the second spatial filter unit 1. For a manner in which the UE determines the second power ramping step of the another second spatial filter other than the second spatial filter 1 of the P second spatial filters based on the second power ramping step of the second spatial filter 1, refer to the foregoing manner of determining the second power ramping step of the second spatial filter other than the second spatial filter A based on the second power ramping step a.

For another example, the configuration information sent by the network device includes the information indicating the first power ramping step of the first spatial filter and information indicating the second power ramping step of each of the P second spatial filters. In this case, the UE may obtain the first power ramping step of the first spatial filter and the second power ramping step of each of the P second spatial filters based on the network configuration information.

Before step S403, the UE may first determine a path loss measurement value of each of the P second spatial filters. Specifically, the user equipment may determine the path loss measurement value of each second spatial filter based on a power loss of a reference signal received by the UE from each of the P second spatial filters.

In some optional embodiments, second path loss values of the P second spatial filters are the same. That is, second path loss values in power adjustment parameters of all the P second spatial filters are the same. The second path loss value is determined by the user equipment based on the path loss measurement values of the P second spatial filters.

The UE may use an arithmetic average or a weighted average of the path loss measurement values of the P second spatial filters as the second path loss value. As for the second path loss value obtained in this way, the path loss measurement value of each of the P second spatial filters is considered, the transmit power determined based on the second path loss value is more appropriate.

The UE may alternatively use a maximum path loss measurement value of the path loss measurement values the P second spatial filters as the second path loss value. To ensure a receive power of the network device, when determining the transmit power, the UE needs to compensate for the transmit power based on the path loss value. In this way, a larger second path loss value indicates a larger compensation power, so that the transmit power of the UE is larger, to help to improve an access success rate of the UE.

The UE may further use a minimum path loss measurement value of the path loss measurement values the P second spatial filters as the second path loss value, so that interference on a network can be balanced.

The UE may alternatively use, as the path loss value, any one of the path loss measurement values of the P second spatial filters that is less than a path loss threshold. The path loss threshold is determined based on the configuration information sent by the network device. If the path loss measurement values of the P second spatial filters do not include a path loss measurement value that is less than the path loss threshold, the minimum path loss measurement value of the path loss measurement values of the P second spatial filters is used as the second path loss value. In this way, the transmit power of the UE is not excessively high, and less interference arising from sending an uplink message by the UE is made on a network.

It should be noted that, in another embodiment, the second path loss may be determined in another manner based on the path loss measurement values of the P second spatial filters. A manner of specifically determining the second path loss value based on the path loss measurement values of the P second spatial filters is not limited in this application.

Before step S403, the UE may determine that differences between path loss measurement values of the N or P second spatial filters meets a preset requirement or a requirement configured by the network device. For example, in the path loss measurement values of the N or P second spatial filters, a difference between a maximum path loss measurement value and a minimum path loss measurement value does not exceed X dB, where X is a preset value, or X is a threshold configured by the network device. In this way, differences between transmit powers of the N spatial filters can be reduced, so that higher sending efficiency can be achieved.

In some other optional embodiments, the path loss values of the P second spatial filters are different, and a path loss value of each of the P second spatial filters is determined based on the path loss measurement value of the second spatial filter. In other words, the path loss value of each of the P second spatial filters is determined based on the path loss measurement value of each second spatial filter. In this way, the second path loss value for calculating the transmit power of each second spatial filter can accurately reflect a path loss situation corresponding to the second spatial filter, so that the transmit power calculated by the UE can be more accurate.

In some embodiments, the first message is the message 3. When the first message is the message 3, the first power is determined based on a first path loss value and a first accumulated power adjustment. For a manner of determining the first path loss value, refer to the foregoing manner of determining the first path loss value in the case of the first message being the message 1. The first accumulated power adjustment is determined by the UE based on the configuration information sent by the network device. For a specific manner of determining the first power, refer to a manner of determining a physical uplink shared channel transmission power [PUSCH transmission power, $P_{PUSCH,b,f,c}(i, j, q_d, l)$] corresponding to the message 3 in 3GPP TS38.213.

It should be noted that, the first power is determined based on the first path loss value and the first accumulated power adjustment. However, this is not limited. The first power may alternatively be determined based on other parameters, in addition to the first path loss value and the first accumulated power adjustment.

In step S402, the transmit power of each of the P second spatial filters in the N second spatial filters is determined based on a second accumulated power adjustment and a second path loss value that are of the second spatial filter. The second accumulated power adjustment and the second path loss value of the second spatial filter of each second spatial filter may be understood as second power adjustment parameters for determining the transmit power of the second spatial filter. Power adjustment parameters corresponding to all of the P second spatial filters may be the same or may be different. If one of the P second spatial filters corresponds to a plurality of beam directions, a transmit power of the second spatial filter is a transmit power in any one of the beam directions.

In the case of the first message being the message 3, for a manner of determining the second path loss value, refer to the foregoing manner of determining the second path loss value in the case of the first message being the message 1.

A second accumulated power adjustment of any one of the P second spatial filters is different from the first accumulated power adjustment. When the UE sends the message 3 switching from one beam direction to n beam directions, the UE adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the message 3.

Second accumulated power adjustments of all of the P second spatial filters may be the same. The UE may obtain one first accumulated power adjustment and one second accumulated power adjustment b. The UE may use the second accumulated power adjustment b as a second accumulated power adjustment of each of the P second spatial filters.

The second accumulated power adjustments of all of the P second spatial filters may be different. The UE may obtain one first accumulated power adjustment and P second accumulated power adjustments. The P second accumulated power adjustments are separately second power adjustments of all of the P second spatial filters. Alternatively, the UE may obtain one first accumulated power adjustment and one second accumulated power adjustment b. Then, the UE uses the second accumulated power adjustment b as a second accumulated power adjustment of a second spatial filter B of the P second spatial filters, and determines a second accumulated power adjustment of a second spatial filter other than the second spatial filter B of the P second spatial filters based on the second accumulated power adjustment b.

The first accumulated power adjustment and the second accumulated power adjustment that are obtained by the UE may be determined based on the configuration information sent by the network device, or may be determined by the UE itself.

Specifically, the first accumulated power adjustment is determined based on a ramping power for sending the message 1 by the UE and/or a first power adjustment value. The second accumulated power adjustment is determined based on the first accumulated power adjustment and/or a second power adjustment value.

If the second accumulated power adjustments of all of the P second spatial filters are the same, the UE may obtain one first power adjustment value and one second power adjustment value. The UE determines the first accumulated power adjustment based on the first power adjustment value and the ramping power for sending the message 1 by the UE, and determines the second accumulated power adjustments of the P second spatial filters based on the second power adjustment value and the first accumulated power adjustment.

If the second accumulated power adjustments of all of the P second spatial filters may be different, the UE may obtain one first power adjustment value and one second power adjustment value. The UE obtains P different second power adjustment values based on the second power adjustment value. The P second power adjustment values one-to-one correspond to the P second spatial filters. A second accumulated power adjustment of each of the P second spatial filters is determined based on the first accumulated power adjustment and a second power adjustment value corresponding to the second spatial filter.

The following describes a process in which the UE obtains the P different second power adjustment values based on the one second power adjustment value.

The P second power adjustment values are respectively denoted as: Delta_1, Delta_2, . . . , and Delta_k, and k=2, 3, . . . , P. The one second power adjustment value is used as Delta_1. In this case, Delta_k=k×Delta_1, or Delta_k=f(k)+Delta_1, and f(k)=k×alpha, or f(k)=alpha×10×round(log 10(k)). alpha is a constant determined based on indication information of the network device or a power adjustment value of the UE, and round indicates rounding off.

The first power adjustment value and the second power adjustment value that are obtained by the UE may be determined based on the configuration information sent by the network device, or may be determined by the UE itself.

The second power adjustment value may be a power adjustment value corresponding to power control (transmit power control) on a PDCCH received by the UE, or may be a power adjustment value for beam switching. The UE may determine, based on the configuration information sent by the network device, the power adjustment value for beam switching, or may determine the power adjustment value for beam switching by the UE itself.

If the UE unsuccessfully retransmits the message 3, the UE may retransmit the message 3 again. When the UE retransmits the message 3 using N' third spatial filters, the UE may not perform power ramping on the N third spatial filters. In other words, an accumulated power adjustment corresponding to transmit powers of the N third spatial filters is equal to the second accumulated power adjustment.

It should be noted that, a transmit power of each second spatial filter is determined based on a second path loss value and a second accumulated power adjustment of the second spatial filter. However, this is not limited. The transmit power of each second spatial filter may alternatively be determined based on other parameters, in addition to the second path loss value and the second accumulated power adjustment.

In some implementations, the first message is the PUCCH. The first power is determined based on a first path loss value and a first accumulated power adjustment. It should be noted that, the first power is determined based on the first path loss value and the first accumulated power adjustment. However, this is not limited. The first power may alternatively be determined based on other parameters, in addition to the first path loss value and the first accumulated power adjustment. In the case of the first message being the PUCCH, for a manner of determining the first power, refer to a manner of determining a target PUCCH transmission power [$P_{O\_PUCCH,\ b,\ f,\ c}(q_u)$] in 3GPP TS38.213.

A transmit power of each of the P second spatial filters in the N second spatial filters is determined based on a second path loss value and a second accumulated power adjustment of the second spatial filter.

The second accumulated power adjustment is different from the first accumulated power adjustment. When the UE sends the PUCCH switching from one beam direction to n beam directions, the UE adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the PUCCH.

For a manner of determining the first path loss value, refer to the foregoing manner of determining the first path loss value in the case of the first message being the message 3. For a manner of determining the second path loss value, refer to the manner of determining the second path loss value in the case of the first message being the message 3.

The first accumulated power adjustment is determined based on the ramping power for sending the message 1 by the UE, the ramping power for sending the message 3 by the UE, and the first power adjustment value. The second accumulated power adjustment is determined based on the first accumulated power adjustment and a second power adjustment value.

For related descriptions of the first accumulated power adjustment and the second accumulated power adjustment, refer to the related descriptions of the first accumulated power adjustment and the second accumulated power adjustment in the case of the first message being the message 3.

It should be noted that, a transmit power of each second spatial filter is determined based on a second path loss value and a second accumulated power adjustment of the second spatial filter. However, this is not limited. The transmit power of each second spatial filter may alternatively be determined based on other parameters, in addition to the second path loss value and the second accumulated power adjustment.

Figure 6:
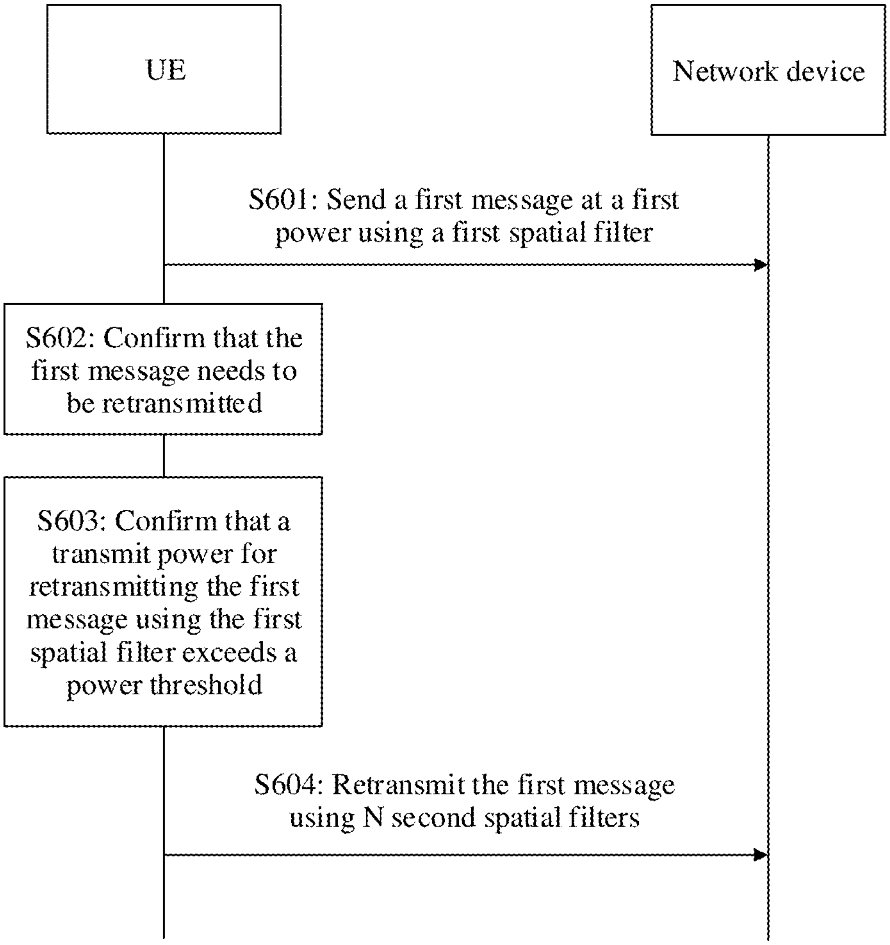
FIG. 6 is another schematic flowchart of a message retransmission method according to an embodiment of this application.

FIG. 6 is another schematic flowchart of a message retransmission method according to an embodiment of this application. The message retransmission method includes the following steps:

S601: UE sends a first message to a network device at a first power using a first spatial filter.

The first message is a message 1, a message 3, or a PUCCH.

In the case of the first message being the message 1, the message 3, or the PUCCH, for a manner of determining the first power, refer to the foregoing embodiment.

S602: The UE confirms that the first message needs to be retransmitted.

S603: The UE confirms that a transmit power for retransmitting the first message using the first spatial filter exceeds a power threshold corresponding to a maximum permissible exposure, where the power threshold is less than or equal to a maximum power corresponding to the maximum permissible exposure.

The power threshold may be equal to the maximum power corresponding to the maximum permissible exposure, or may be slightly less than the maximum power corresponding to the maximum permissive exposure.

It may be understood that, when confirming that the first message needs to be retransmitted, the UE first calculates the transmit power required for retransmitting the first message using the first spatial filter. If the transmit power required for retransmitting the first message using the first spatial filter exceeds the power threshold, the UE switches to retransmit the first message using N second spatial filters.

For example, when the first message is the message 1, the transmit power required by the UE to retransmit the first message using the first spatial filter is a sum of the first power and a first power ramping step. When the first message is the message 3, the transmit power required by the UE to retransmit the first message using the first spatial filter is a sum of the first power and a first power adjustment value. When the first message is the PUCCH, the transmit power required by the UE to retransmit the first message using the first spatial filter is a sum of the first power and a first power adjustment value.

S604: The UE retransmits the first message to the network device using the N second spatial filters, where N is a positive integer.

Specifically, the N second spatial filters correspond to n beam directions, where n is a positive integer, and n>N.

In this way, when the first power is about to exceed or has exceeded the maximum power corresponding to the maximum permissible exposure, the UE switches to retransmit the first message to the network device in a plurality of beam directions, so that a total transmit power for sending the first message by the UE is greater than the first power. Therefore, the transmit power of the UE is not constrained by the maximum power corresponding to the maximum permissible exposure, a probability of successfully sending the first message is increased, and a network access speed of the UE can be increased.

It may be understood that the information transmission method in this embodiment may also be implemented by the communication device 500 in the foregoing embodiment. That is, the communication device 500 performs steps S601 to S604. Specifically, the processor 501 reads computer instructions from the memory 502 to perform the following operations: The transmitter 5031 sends the first message to the network device at the first power using the first spatial filter; and when the processor 501 confirms that the first message needs to be retransmitted and confirms that the first power exceeds the power threshold corresponding to the maximum permissible exposure, the transmitter 5031 retransmits the first message to the network device using the N second spatial filters.

It should be noted that, for specific implementation processes of steps S601, S602, and S604, refer to the related descriptions of steps S401, S402, and S403 in the foregoing embodiment. Other supplementary descriptions in the foregoing embodiments are also applicable to this embodiment.

In some embodiments, in step S403 or step S604, differences between transmit powers of all of the N second spatial filters meet a preset requirement or a requirement configured by the network device. For example, a difference between a maximum transmit power and a minimum transmit power of the N second spatial filters does not exceed Y dB, where Y is a preset value, or Y is a threshold configured by the network device. In this way, differences between the transmit powers of the N spatial filters are reduced, and a higher performance gain can be obtained.

Figure 7:
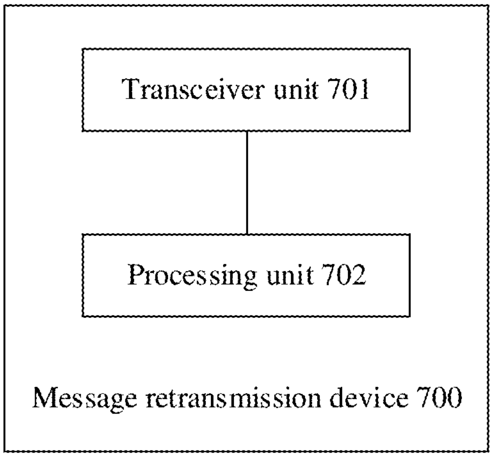
FIG. 7 is a schematic diagram of modules of a message retransmission device according to an embodiment of this application.

FIG. 7 is a schematic diagram of modules of a message retransmission device according to an embodiment of this application. The message retransmission device 700 includes a transceiver unit 701 and a processing unit 702. The transceiver unit 701 may include a sending unit and a receiving unit, which are respectively configured to perform sending and receiving operations in the method embodiments. The processing unit 702 is configured to implement operations other than the sending and receiving operations. For example, the transceiver unit 701 is configured to send a first message to a network device at a first power using a first spatial filter, and retransmit the first message to the network device using N second spatial filters, where the N second spatial filters include at least one spatial filter different from the first spatial filter, and N is a positive integer. The first message is a message sent by the UE to the network device in a random access process. The first message is a message 1, a message 3, or a PUCCH. When the first message is unsuccessfully sent or the random access fails, the first message is switched to be retransmitted in a plurality of beam directions. This helps increase a total transmit power of the first message, and increase a probability of successfully sending the first message.

In some implementations, the first message is the message 1. A second power ramping counter corresponding to a transmit power of each of P second spatial filters in the N second spatial filters is greater than a first power ramping counter corresponding to the first power, where P is a positive integer, and P≤N.

In this embodiment, when the sending of the message 1 fails or the random access fails, the message 1 is switched to be retransmitted using the N second spatial filters, and power ramping is performed in beam directions corresponding to the P second spatial filters of the N second spatial filters, so that the transmit power of each of the P second spatial filters can be increased. This helps increase a total power of the N second spatial filters, and increase a probability of successfully sending the message 1.

The message retransmission device 700 in this embodiment may be, for example, the user equipment, or may be a chip or a functional module of the user equipment. Alternatively, the message retransmission device 700 in this embodiment is deployed in the communication device 500 in embodiments of this application. The transceiver 503 in the foregoing embodiment may be used as the transceiver unit 701, and the processor 501 in the foregoing embodiment may be used as the processing unit 702.

Based on the foregoing implementation in which the first message is the message 1, in some implementations, the first power is determined by the processing unit 702 based on a first power ramping step and the first power ramping counter, and the transmit power of each of the P second spatial filters is determined by the processing unit 702 based on a second power ramping step and the second power ramping counter that correspond to the transmit power of the second spatial filter.

Optionally, the second power ramping step is determined by the processing unit 702 based on the first power ramping step. In this way, the network device configures only one power ramping step as the first power ramping step, so that radio transmission resources can be saved. In addition, the processing unit 702 calculates the second power ramping step only once for the P second spatial filters, so that a data processing amount of the processing unit 702 can be reduced.

Optionally, if P≥2, a second power ramping step a of a second spatial filter A of the P second spatial filters is determined based on configuration information sent by the network device. In the P second spatial filters, a second power ramping step of a second spatial filter other than the second spatial filter A is determined based on the second power ramping step a. In this way, the network device can better control a transmit power by configuring second power ramping steps of the P second spatial filters. The second spatial filter A is any one of the P second spatial filters.

Optionally, path loss values of the P second spatial filters are the same, and the path loss value is minimum in path loss measurement values of the P second spatial filters. Alternatively, the path loss value is any one of the path loss measurement values of the P second spatial filters that is less than a path loss threshold.

Further, the processing unit 702 is further configured to obtain a path loss measurement value of each of the P second spatial filters. The path loss measurement value of each of the P second spatial filters is for determining a path loss value of each of the P second spatial filters. The path loss value of each of the P second spatial filters is for determining a transmit power for retransmitting the first message using the second spatial filter.

Path loss values of the P second spatial filters are the same, and the path loss values are determined by the UE based on the path loss measurement values of the P second spatial filters. As for a second path loss value obtained in this way, the path loss measurement value of each of the P second spatial filters is considered, and the transmit power determined based on the second path loss value is appropriate.

Alternatively, path loss values of the P second spatial filters are different, and a path loss value of each of the P second spatial filters is determined based on the path loss measurement value of the second spatial filter. In this way, the second path loss value for calculating the transmit power of each second spatial filter can accurately reflect a path loss situation corresponding to the second spatial filter, so that the transmit power calculated by the processing unit 702 can be more accurate.

In some implementations, the first message is the message 3. A second accumulated power adjustment corresponding to each of P second spatial filters in the N second spatial filters is different from a first accumulated power adjustment corresponding to the first spatial filter. When sending of the message 3 in one beam direction switches to n beam directions, transmit powers in beam directions corresponding to the P second spatial filters are adjusted by adjusting accumulated power adjustment values of the P second spatial filters. In this way, power ramping in the beam directions corresponding to the P second spatial filters is implemented. This helps increase a total power of the N second spatial filters, and increase a probability of successfully sending the message 3.

In some implementations, the first message is the PUCCH. A second accumulated power adjustment corresponding to each of P second spatial filters in the N second spatial filters is different from a first accumulated power adjustment corresponding to the first spatial filter. When the UE sends the PUCCH switching from one beam direction to n beam directions, the UE adjusts, by adjusting accumulated power adjustment values of the P second spatial filters, transmit powers in beam directions corresponding to the P second spatial filters. In this way, power ramping in the beam directions corresponding to the P second spatial filters is implemented. This helps increase a total power of the N second spatial filters, and increase a probability of successfully sending the PUCCH.

In some implementations, if N≥2, synchronization signals associated with first messages sent using at least two of the N second spatial filters are different, physical broadcast channel blocks associated with the first messages sent using the at least two of the N second spatial filters are different, or channel state information-reference signal resources associated with the first messages sent using the at least two of the N second spatial filters are different. In this way, a coverage area of the first message can be increased, and a probability of successfully sending the first message can be increased. The first message is the message 1, the message 3, or the PUCCH.

In some implementations, the processing unit 702 is further configured to confirm that the transmit power for retransmitting the first message using the first spatial filter exceeds the power threshold corresponding to the maximum permissible exposure. The power threshold is less than or equal to a maximum power corresponding to the maximum permissible exposure. In this way, when the first power is about to exceed or has exceeded the maximum power corresponding to the maximum permissible exposure, the first message is switched to be retransmitted to the network device in a plurality of beam directions, so that a total transmit power for sending the first message is greater than the first power, and the transmit power is not constrained by the maximum power corresponding to the maximum permissible exposure, and the probability of successfully sending the first message is increased. The first message is the message 1, the message 3, or the PUCCH.

It should be noted that explanations and descriptions of the message retransmission method in the foregoing embodiments are also applicable to the message retransmission device in the foregoing embodiments.

Embodiments of this application further provide a communication device. The communication device is user equipment or a terminal device, and includes a processor and a memory. The memory is configured to store computer instructions. The processor executes a computer program or the instructions in the memory, so that the message retransmission method in any one of the foregoing embodiments is performed.

Embodiments of this application further provide an apparatus. The apparatus includes a processor. The processor is coupled to a memory. When the processor executes a computer program or instructions in the memory, the message retransmission method in any one of the foregoing embodiments is performed. Optionally, the apparatus further includes the memory. Optionally, the apparatus further includes a communication interface, and the processor is coupled to the communication interface.

In an implementation, the apparatus is user equipment. When the communication device is the user equipment, the communication interface may be a transceiver or an input/output interface. Optionally, the transceiver may be a transceiver circuit. Optionally, the input/output interface may be an input/output circuit.

In another implementation, the apparatus is a chip or a chip system. When the apparatus is the chip or the chip system, the communication interface may be an input/output interface, an interface circuit, an output circuit, an input circuit, a pin, a related circuit, or the like on the chip or in the chip system. The processor may also be embodied as a processing circuit or a logic circuit.

Embodiments of this application further provide a communication device. The communication device includes a processor and an interface circuit. The interface circuit is configured to receive code instructions and transmit the code instructions to the processor. The processor runs the code instructions to perform the method in any one of the foregoing embodiments.

Embodiments of this application further provide a system. The system includes the foregoing user equipment and the foregoing network device.

Embodiments of this application further provide a computer program product. The computer program product includes a computer program (which may also be referred to as code or instructions). When the computer program is run, a computer is enabled to perform the message retransmission method in any one of the foregoing embodiments.

Embodiments of this application further provide a computer-readable storage medium. The computer-readable medium stores a computer program (which may also be referred to as code or instructions). When the computer program is run on a computer, the computer is enabled to perform the message retransmission method in any one of the foregoing embodiments.

Embodiments of this application further provide a communication device, including an input circuit, an output circuit, and a processing circuit. The processing circuit is configured to receive a signal using the input circuit, and transmit a signal using the output circuit, so that the message retransmission method in any one of the foregoing embodiments is implemented.

In a specific implementation process, the communication device may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit or the output circuit at different moments. Specific implementations of a processor and various circuits are not limited in this application.

This application provides a computer-readable storage medium. The computer-readable storage medium stores computer instructions, and the computer instructions indicate user equipment to perform the message retransmission method in any one of the foregoing embodiments.

It should be understood that, the processor mentioned in embodiments of this application may be a central processing unit (CPU), or may be another general-purpose processor, a digital signal processor (DSP), an application specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include both. The non-volatile memory may be a read-only memory (ROM), a programmable ROM (PROM), an erasable PROM (EPROM), an electrically EPROM (EEPROM), or a flash memory. The volatile memory may be an RA memory (RAM), used as an external cache. By way of example, and not limitation, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It should be noted that the memory (a storage module) is integrated into a processor when the processor is a general-purpose processor, a DSP, an ASIC, an FPGA, another programmable logic device, a discrete gate or transistor logic device, or a discrete hardware component.

It should be noted that the memory described in this specification aims to include but is not limited to these memories and any memory of another proper type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments.

In several embodiments provided in this application, it should be understood that the disclosed system, apparatus, and method may be implemented in another manner. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

A sequence of the steps of the method in embodiments of this application may be adjusted, combined, or removed based on an actual requirement.

The modules in the apparatus in embodiments of this application may be combined, divided, and deleted depending on an actual requirement.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A message retransmission method, comprising:

sending, by a user equipment, a message to a network device at a first power using a first spatial filter; and retransmitting, by the user equipment, the message to the network device using N second spatial filters, wherein a second power ramping counter corresponding to a transmit power of each of P second spatial filters is greater than a first power ramping counter corresponding to the first power, such that the transmit power of each of the P second spatial filters is increased relative to the first power, thereby increasing a total power of the N second spatial filters, wherein the N second spatial filters comprise at least one spatial filter different from the first spatial filter, and both N and P are positive integers, and P≤N; and in response to determination that the user equipment unsuccessfully retransmits the message after retransmitting the message to the network device using the N second spatial filters, retransmitting, by the user equipment, the message using N' third spatial filters, wherein N' is a positive integer, N'≥max (N, 2), and power ramping is not performed on the N' third spatial filters, such that a third power ramping counter corresponding to transmit powers of the N' third spatial filters is equal to the second power ramping counter, wherein the first power is determined based on a first power ramping step and the first power ramping counter, wherein, for each of the P second spatial filters, the transmit power of the second spatial filter is determined based on a second power ramping step and the second power ramping counter that correspond to the second spatial filter, and wherein the second power ramping step is determined based on the first power ramping step.

2. The method according to claim 1, further comprising: before the retransmitting, by the user equipment, the message to the network device using N second spatial filters, obtaining, by the user equipment, a path loss measurement value of each of the P second spatial filters, wherein:

when path loss values of the P second spatial filters are the same, the path loss values are determined by the user equipment based on path loss measurement values of the P second spatial filters;

when path loss values of the P second spatial filters are different;

for each of the P second spatial filters, a path loss value of the second spatial filter is determined based on the path loss measurement value of the second spatial filter; and the path loss value of the second spatial filter is for determining a transmit power for retransmitting the message using the second spatial filter.

3. The method according to claim 2, wherein:

the path loss values of the P second spatial filters are the same; and the path loss value is a minimum path loss measurement value in the path loss measurement values of the P second spatial filters or any one of the path loss measurement values of the P second spatial filters that is less than a path loss threshold.

4. The method according to claim 1, wherein:

synchronization signals associated with messages sent using at least two of the N second spatial filters are different, where N≥2;

physical broadcast channel blocks associated with messages sent using the at least two of the N second spatial filters are different, where N≥2; or channel state information-reference signal resources associated with messages sent using the at least two of the N second spatial filters are different, where N≥2.

5. The method according to claim 1, further comprising: before the retransmitting, by the user equipment, the message to the network device using N second spatial filters, confirming, by the user equipment, that a transmit power for retransmitting the message using the first spatial filter exceeds a power threshold corresponding to a maximum permissible exposure, wherein the power threshold is less than or equal to a maximum power corresponding to the maximum permissible exposure.

6. A message retransmission device, comprising a transceiver and at least one processor, wherein the transceiver is configured to:

send a message to a network device at a first power using a first spatial filter;

retransmit the message to the network device using N second spatial filters, wherein a second power ramping counter corresponding to a transmit power of each of P second spatial filters is greater than a first power ramping counter corresponding to the first power, such that the transmit power of each of the P second spatial filters is increased relative to the first power, thereby increasing a total power of the N second spatial filters, wherein the N second spatial filters comprise at least one spatial filter different from the first spatial filter, and both N and P are positive integers, and P≤N; and in response to determination that the message is retransmitted unsuccessfully, retransmit the message using N' third spatial filters after retransmitting the message to the network device using the N second spatial filters, wherein N' is a positive integer, N'≥max(N, 2), and power ramping is not performed on the N' third spatial filters, such that a third power ramping counter corresponding to transmit powers of the N' third spatial filters is equal to the second power ramping counter, wherein the first power is determined by the at least one processor based on a first power ramping step and the first power ramping counter, wherein, for each of the P second spatial filters, the transmit power of the second spatial filter is determined by the at least one processor based on a second power ramping step and the second power ramping counter that correspond to the second spatial filter, and wherein the second power ramping step is determined based on the first power ramping step.

7. The message retransmission device according to claim 6, wherein: the at least one processor is configured to:

obtain a path loss measurement value of each of the P second spatial filters, wherein when path loss values of the P second spatial filters are the same, the path loss values are determined by the at least one processor based on path loss measurement values of the P second spatial filters;

when path loss values of the P second spatial filters are different;

for each of the P second spatial filters, a path loss value of the second spatial filter is determined by the at least one processor based on the path loss measurement value of the second spatial filter; and the path loss value of the second spatial filter is for determining a transmit power for retransmitting the message using the second spatial filter.

8. The message retransmission device according to claim 7, wherein:

the path loss values of the P second spatial filters are the same; and the path loss value is a minimum path loss measurement value in the path loss measurement values of the P second spatial filters or any one of the path loss measurement values of the P second spatial filters that is less than a path loss threshold.

9. The message retransmission device according to claim 6, wherein:

synchronization signals associated with messages sent using at least two of the N second spatial filters are different, where N≥2;

physical broadcast channel blocks associated with messages sent using the at least two of the N second spatial filters are different, where N≥2; or channel state information-reference signal resources associated with messages sent using the at least two of the N second spatial filters are different, where N≥2.

10. The message retransmission device according to claim 6, wherein the at least one processor is further configured to:

confirm that a transmit power for retransmitting the message using the first spatial filter exceeds a power threshold corresponding to a maximum permissible exposure, wherein the power threshold is less than or equal to a maximum power corresponding to the maximum permissible exposure.

11. A communication device, comprising:

at least one processor communicably coupled to one or more memories storing programming instructions for execution by the at least one processor to cause the communication device to perform operations comprising:

sending a message to a network device at a first power using a first spatial filter; and retransmitting the message to the network device using N second spatial filters, wherein a second power ramping counter corresponding to a transmit power of each of P second spatial filters is greater than a first power ramping counter corresponding to the first power, such that the transmit power of each of the P second spatial filters is increased relative to the first power, thereby increasing a total power of the N second spatial filters, wherein the N second spatial filters comprise at least one spatial filter different from the first spatial filter, and both N and P are positive integers, and P≤N; and in response to determination that the message is retransmitted unsuccessfully, retransmitting the message using N' third spatial filters after retransmitting the message to the network device using the N second spatial filters, wherein N' is a positive integer, N'≥max (N, 2), and power ramping is not performed on the N' third spatial filters, such that a third power ramping counter corresponding to transmit powers of the N' third spatial filters is equal to the second power ramping counter, wherein the first power is determined based on a first power ramping step and the first power ramping counter, wherein, for each of the P second spatial filters, the transmit power of the second spatial filter is determined based on a second power ramping step and the second power ramping counter that correspond to the second spatial filter, and wherein the second power ramping step is determined based on the first power ramping step.

12. The communication device according to claim 11, wherein:

the operations further comprise: obtaining a path loss measurement value of each of the P second spatial filters, wherein when path loss values of the P second spatial filters are the same, the path loss values are determined by the communication device based on path loss measurement values of the P second spatial filters;

when path loss values of the P second spatial filters are different;

for each of the P second spatial filters, a path loss value of the second spatial filter is determined based on the path loss measurement value of the second spatial filter; and the path loss value of the second spatial filter is for determining a transmit power for retransmitting the message using the second spatial filter.

13. The communication device according to claim 12, wherein:

the path loss values of the P second spatial filters are the same; and the path loss value is a minimum path loss measurement value in the path loss measurement values of the P second spatial filters or any one of the path loss measurement values of the P second spatial filters that is less than a path loss threshold.

14. The communication device according to claim 11, wherein:

synchronization signals associated with messages sent using at least two of the N second spatial filters are different, where N≥2;

physical broadcast channel blocks associated with messages sent using the at least two of the N second spatial filters are different, wherein N≥2; or channel state information-reference signal resources associated with messages sent using the at least two of the N second spatial filters are different, where N≥2.

15. The communication device according to claim 11, wherein the operations further comprise:

confirming that a transmit power for retransmitting the message using the first spatial filter exceeds a power threshold corresponding to a maximum permissible exposure, wherein the power threshold is less than or equal to a maximum power corresponding to the maximum permissible exposure.

* * * * *